March 26, 1968 D. E. LAUX ET AL 3,375,012

PHONOGRAPH PICKUP DEVICE

Filed Jan. 22, 1965

INVENTORS
DAVID E. LAUX &
JACK M. WHITE

BY Eugene M. Whitacre

Attorney

United States Patent Office 3,375,012

Patented Mar. 26, 1968

3,375,012

PHONOGRAPH PICKUP DEVICE

David E. Laux and Jack M. White, Indianapolis, Ind., assignors to Radio Corporation of America, a corporation of Delaware Filed Jan. 22, 1965, Ser. No. 427,259
6 Claims. (Cl. 274—37)

ABSTRACT OF THE DISCLOSURE

The stylus arm of a phonograph pickup extends from a damping block of a resilient material. The damping block is positioned in a channel opening in a turnover type receptacle. The side and bottom walls defining the receptacle opening restrain vertical and lateral movement of the block when the pickup is in its 33 or stereo mode of operation, and restrain substantially only lateral movement of the block when the pick-up is in its 78 or mono mode of operation.

This invention relates to phonograph pickups, and more particularly to turnover type pickups operable to transduce 33 r.p.m. or 45 r.p.m. recordings.

A stylus suitable for transducing 33 r.p.m. or 45 r.p.m. (hereinafter referred to as fine groove) records should have a tip radius of approximately 0.7 mil, and a stylus suitable for transducing a 78 r.p.m. (hereinafter referred to as coarse groove) record should have a tip radius of approximately 3.0 mils. Pickups for transducing both fine and coarse groove records usually comprise two separate styli and means for bringing one or the other of said styli into a record engaging position.

Currently available stereophonic fine groove records carry their information in both vertical and lateral undulations of the record grooves, while currently available monophonic coarse groove records carry their information in only lateral undulations of the record grooves. It therefore follows that one of the requirements of a high quality monaural pickup is that it have a high lateral response characteristic and a low vertical response characteristic. That is, the pickup should have little or no electrical response to vertical stylus motion, and a good response to lateral stylus motion. On the other hand, a high quality pickup should have a good response to both vertical and lateral stylus motion.

Accordingly, it is an object of the present invention to provide an improved stylus assembly for a pickup capable of reproducing both fine groove and coarse groove recordings.

Another object of the present invention is to provide a phonograph pickup having a turnover stylus assembly with improved performance on coarse groove records.

In accordance with the invention a mechanical-to-electrical transducing element, such as piezoelectric crystal, is supported in a housing. A stylus arm having a pair of record engaging styli mounted on one end is mechanically coupled to the transducing element. The styli extend outwardly from the stylus arm and in opposite directions from each other. The other end of the stylus arm is mounted in a damping block of a resilient material. The damping block is positioned in a channel shaped member with the portion of the block furthest from the stylus arm secured in the holder so that the portion of the block containing the stylus arm can move in the channel opening. The holder containing the damping block is mounted in the housing so that one of the styli depends downwardly from the holder at an angle to engage a record groove, and is adapted for rotation to selectively bring the other stylus into a suitable position to engage a record groove.

The novel features which are believed to be characteristic of the invention are set forth with particularity in the appended claims. The invention itself, however, both as to its organization and method of operation, together with further objects and advantages thereof, will be better understood from the following description considered in conjunction with the accompanying drawings in which:

In referring to the drawings, like reference numerals designate the same components throughout the figures.

Figures 1, 2, 3, 4:
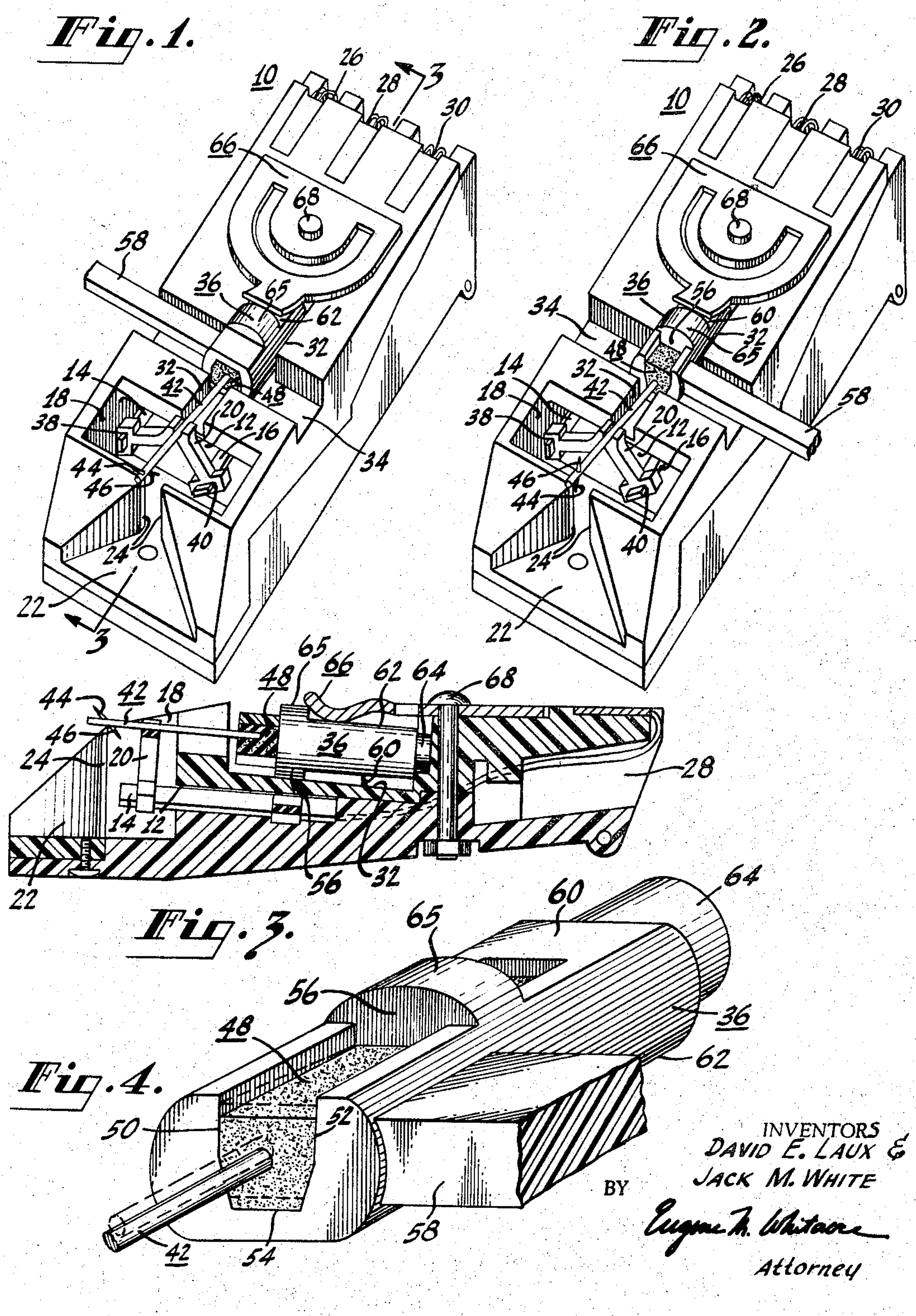
FIGURE 1 is a perspective bottom view of a phonograph pickup with the turnover stylus assembly embodying the invention.
FIGURE 2 is a perspective bottom view of the pickup of FIGURE 1 with the turnover stylus assembly in its alternate position.
FIGURE 3 is a sectional side view of the pickup taken along the sectional line 3—3 of FIGURE 1.
FIGURE 4 is an enlarged perspective partial view of the turnover stylus assembly.

The pickup in the present example includes a substantially rectangularly shpade casing 10, preferably comprising two opposing sections of molded plastic and defining an internal cavity 12, extending substantially the length of the casing 10, and in which a pair of piezoelectric transducing elements 14 and 16 are housed. The bottom portion of the casing 10 has a rectangularly shaped opening 18 near the front end which communicates with said internal cavity 12 and into which a yoke member 20 is positioned. The front end of the casing 10 has a triangular shaped recess 22 communicating at its vertex 24 with the rectangularly shaped opening 18 and the rear end of the casing 10 is provided with three portal openings 26, 28 and 30 which communicate with the internal cavity 12 and through which electrical connections are made to the transducer elements as indicated more particularly in FIGURES 1, 2 and 3. A recess 32 extends axially from the rectangularly shaped opening 18 part-way along the bottom portion of the casing 10. The axially extending recess 32 is crossed substantially at its midpoint by a recess 34 laterally extending across the bottom portion of the casing 10. As shown in FIGURES 1 and 2, the portion of the recess 32 between the opening 18 and the lateral recess 34 is made narrower and shallower than its remaining portion so as to provide a retaining shoulder for a holder 36 as will be hereinafter described.

The transducing elements 14 and 16 have a rectangular cross-section and are mounted in the casing 10, in accordance with known techniques, so that their major surfaces lie in perpendicular planes, with each plane disposed at an angle of 45° to a plane extending vertically through the longitudinal axis of the pickup casing 10.

A yoke member 20 formed of an elastomer material has a pair of divergent legs with apertures 38 and 40 for receiving the exposed ends of the respective transducing elements 14 and 16, and a slotted reentrant central portion for receiving a stylus arm 42 as shown more particularly in FIGURES 1, 2 and 3. The divergent legs are stiff axially but flexible in directions normal to said axis. Thus, axial forces or vibrations imparted to either of the divergent legs will be transmitted to the associated transducer element, thereby causing a bending torque on the transducing element.

A stylus arm 42 includes an elongated thin beam section positioned in driving relation to the yoke member 20. A pair of styli 44 and 46 for playing different types of records, such as fine and coarse groove recordings are mounted on opposite sides of the stylus arm 42 and near one end thereof. For example, the stylus 44 may have a 0.7 mil diameter tip for use with conventional fine groove monophonic and stereophonic records, and the stylus 46 may have a 3.0 mil diameter tip for use with conventional 78 r.p.m. coarse groove records.

A resilient movable damping block 48 made of an elastomer material such as rubber has a rectangular cross-section with partially tapered side portions 50 and 52 as shown in FIGURE 4. The block 48 is mounted in a holder 36 having an open channel 54 conformed to the shape of the block 48. The rear end of the stylus arm 42 is inserted in one end of said block 48 so that when the 3.0 mil stylus 46 is engaging a record, the channel 54 axial opening faces the record. The rear end of the block 48 is fixedly secured in the holder 36 by means of an adhesive material affixed thereto and/or a bridge member 56 laterally crossing the channel 54 and forming a part of the holder 36. The stylus arm 42 extends into the block 48 to a point short of the bridge 56 so that the stylus arm 42 and the block 48 are free to flex.

The holder 36 may be of molded construction and is provided with an arm 58 extending outwardly in a plane normal to the side portions 50 and 52 of the block 54. The end portion of the holder 36 remote from the block 48 is provided with a pair of flat surfaces 60 and 62 parallel to the plane of said arm 58, a cylindrical bearing surface 64 and a second cylindrical bearing surface 65 (including portion 56), both bearing surfaces being in axial alignment with the stylus arm 42.

The holder 36 containing the block 48 is positioned in the casing 10 so that both bearing surfaces fit into conforming areas of recess 32 and allow axial rotation of said holder 36. The forward part of the holder 36 abuts the shoulder formed at the point where the recess 32 narrows, and the arm 58 lies in the lateral recess 34 for either position thereof. The stylus arm 42 is received in the slotted central portion of the yoke member 20 so that one of the styli depends downwardly at an angle to engage a record groove. The arm extending along one portion of the lateral recess 34 can be used to rotate the holder 180 degrees in the axial recess 32 and thereby bring the selected stylus into suitable position to engage a record groove.

The holder 36 is retained in the axial recess 32 by a leaf spring 66 which is secured to the bottom portion of the casing 10 by a rivet or screw 68. The rivet or screw 68 also serves as a means for fastening the top and bottom portions of the casing 10 together in complementary relationship. The free end of the spring 66 is adapted to engage and cover one of the exposed flat surfaces 60 or 62 of the holder 36 by forming a detent therewith, thereby restraining said holder 36 from slipping out of the recess 32 while also allowing it to rotate between detents. In the present example, the spring 66 is made of a metal having sufficient resiliency to allow it to be deflected by the holder 36 when rotated and still maintain a strong restraining force to insure that the holder 36 does not slip out of the recess 32.

FIGURE 1 shows the stylus arm 42 in driving engagement with the yoke member 20 and having the 0.7 mil stylus 44 in position to engage the fine grooves of a stereophonic microgroove record. In this position the record pushes up on the stylus 44 with a force equal to the tracking force of the pickup. The stylus arm 42 tends to rotate about its point of contact with the yoke member 20 until the damping block 48 bottoms in the channel 54. The damping block 48 is restrained from moving sideways by the side walls of the holder 36 and is prevented from moving vertically due to its being "bottomed" in the channel 32 as described above.

FIGURE 2 shows the stylus arm 42 in driving engagement with the yoke member 20 and having the 3.0 mil stylus 46 in position to engage the coarse grooves of a 78 r.p.m. record. In this position the force on the stylus 46 from the record again causes the damping block 48 to rotate about its point of contact with the yoke member 20. This time the block 48 is free to move vertically up toward the channel 54 opening, but is still restrained from moving sideways by the side walls of the holder 36. This vertical displacement of the block 48 is illustrated in FIGURE 4 by the dashed lines.

When the pickup is set for transduction of fine groove records, the damping block 48 is restrained against vertical and lateral movement, and lateral and vertical vibrations imparted to the stylus 44 are transmitted to the yoke member 20. When the pickup is set for transduction of coarse groove records, lateral vibrations are transmitted to the yoke member 20, but vertical vibrations are reduced in transmission by the vertical movement of the block 48 toward the channel 32 opening. Thus, the invention provides a pickup capable of reproducing both fine groove and coarse groove records and having a reduced response to vertical stylus motion when set for transduction of coarse groove records.

What is claimed is:

1. A phonograph pickup assembly comprising:

a housing having a pair of mechanical-to-electrical transducing elements positioned therein;

an elongated stylus arm including first and second styli attached to one end and extending outwardly therefrom in opposite directions, said first stylus having a greater tip radius than said second stylus;

a yoke member mounted in said housing and having a pair of divergent legs and a re-entrant central portion, each of said legs engaging a different one of said transducing elements, and said central portion engaging said stylus arm at a point intermediate to its ends;

a resilient damping block having an opening in one portion for receiving the other end of said stylus arm;

means including a receptacle having a channel for receiving said damping block and restraining said block against horizontal movement, said channel being shaped to provide for vertical bodily movement of the portion of said block containing said other end of said stylus arm when said first stylus is in record engaging position and to restrain vertical bodily movement of the portion of said block containing said other end of said stylus arm when said second stylus is in record engaging position; and means for rotatably mounting said receptacle on said housing to selectively bring one of said styli into record engaging position.

2. In a phonograph pickup of the type including a body member supporting a pair of mechanical-to-electrical transducing elements, a combination which comprises:

an elongated stylus arm including a first and second styli attached to one end and extending outwardly therefrom in opposite directions, said first stylus having a greater tip radius than said second stylus;

means for coupling said transducing elements to said stylus arm at a point intermediate to its ends;

a resilient damping block having an opening in one portion for receiving the other end of said stylus arm;

a receptacle having a bottom wall, and a pair of side walls, forming an elongated channel like opening in one portion of said receptacle;

means for mounting said block in said receptacle so that the portion of the block opposite the stylus arm receiving portion is fixedly held in said receptacle and the portion of the block containing the stylus arm is free to move bodily within the channel in a direction substantially normal to the longitudinal open side of said channel;

said stylus arm being received in said block so that said first stylus is in record engaging position when said receptacle opening faces toward a record to be played and said second stylus is in record engaging position when said receptacle opening faces away from a record to be played; and means for rotatably mounting said receptacle on said body member to selectively bring one of said styli into record engaging position.

3. A phonograph pickup according to claim 2 wherein the side wall portions of said receptacle are partially tapered and where the damping block mounted in said receptacle is shaped to conform to said receptacle opening.

4. A stylus assembly which comprises:

an elongated stylus arm including a stylus near one end thereof;

a resilient damping block having an opening in one portion for receiving the other end of said stylus arm;

a receptacle having a channel for receiving said damping block; and means for mounting said block in said receptacle channel so that the portion of the block opposite the stylus arm receiving portion is fixedly held in said receptacle and the portion of the block containing the stylus arm is free to move bodily within said channel in a direction substantially normal to the axial open side of said channel.

5. A turnover stylus assembly which comprises:

an elongated stylus arm including a pair of styli near one end thereof extending in opposite directions;

a reslient damping block having an opening in one portion for receiving the other end of said stylus arm;

a receptacle having a bottom wall, and a pair of side walls, forming an elongated channel like opening in one portion of said receptacle; and means for mounting said block in said receptacle so that the portion of the block opposite the stylus arm receiving portion is fixedly held in said receptacle and the portion of the block containing the stylus arm is free to move bodily within said channel and in a direction substantially normal to the longitudinal open side of said channel.

6. A turnover stylus assembly according to claim 5 wherein the side wall portions of said receptacle are partially tapered and where the damping block mounted in said receptacle is shaped to conform to said channel opening.

References Cited

UNITED STATES PATENTS 3,243,523 3/1966 Richer -------------- 274—37

LEONARD FORMAN, *Primary Examiner.*

F. J. D'AMBROSIO, *Assistant Examiner.*